(12) United States Patent
Korczak-Cegielska et al.

(10) Patent No.: US 12,550,888 B2
(45) Date of Patent: Feb. 17, 2026

(54) KIDNEY COOLING SYSTEM

(71) Applicant: Grena USA LLC, Wilmington, DE (US)

(72) Inventors: Ilona Korczak-Cegielska, Warsaw (PL); Alberto Breda, Barcelona (ES); Andrzej Decewicz, Nottingham (GB); Konrad Brodaczewski, Dublin (IE)

(73) Assignee: Grena USA LLC, Wilmington, DE (US)

( * ) Notice: Subject to any disclaimer, the term of this patent is extended or adjusted under 35 U.S.C. 154(b) by 1026 days.

(21) Appl. No.: 17/666,010

(22) Filed: Feb. 7, 2022

(65) Prior Publication Data
US 2022/0248667 A1    Aug. 11, 2022

Related U.S. Application Data

(60) Provisional application No. 63/146,656, filed on Feb. 7, 2021.

(51) Int. Cl.
*A01N 1/02*     (2006.01)
*A01N 1/143*    (2025.01)
*A01N 1/147*    (2025.01)

(52) U.S. Cl.
CPC ............. *A01N 1/143* (2025.01); *A01N 1/147* (2025.01)

(58) Field of Classification Search
None
See application file for complete search history.

(56) References Cited

U.S. PATENT DOCUMENTS

| | | | |
|---|---|---|---|
| 4,217,890 A | 8/1980 | Owens | |
| 4,971,056 A | 11/1990 | Seacord | |
| 5,014,695 A * | 5/1991 | Benak | A61F 7/12 607/105 |
| 6,736,836 B2 | 5/2004 | Montgomery | |
| 7,780,712 B2 | 8/2010 | Thomas et al. | |
| 11,606,951 B1 * | 3/2023 | Miller | A01N 1/142 |
| 2001/0025191 A1 | 9/2001 | Montgomery | |
| 2006/0088927 A1 * | 4/2006 | Kansoul | A61F 7/10 435/284.1 |
| 2015/0289940 A1 | 10/2015 | Campsen | |

(Continued)

OTHER PUBLICATIONS

Territo "Step by Step Development of Cold Ischemia Device for Open and Robotic-assisted Renal Transplantation", European Urology vol. 80, No. 6, (2021) pp. 738-745 pub May 26, 2021.

(Continued)

*Primary Examiner* — Michael A Marcheschi
*Assistant Examiner* — Ashley Lopezlira
(74) *Attorney, Agent, or Firm* — Wan Chieh Lee; Haug Partners LLP

(57) ABSTRACT

A medical device for thermally treating a donor organ to be transplanted within a patient, comprises a jacket. The jacket includes a first section and a second section adjacent to the first section. The first and second sections are folded about a hinge to form a pocket sized to receive the donor organ. The first and second sections are secured together by a plurality of conjoined weld bar sets. A sling depends from the second section and has a strap. The strap includes a first end portion coupled to the sling, and an opposite second end portion affixed to one set of the plurality of conjoined weld bar sets.

22 Claims, 8 Drawing Sheets

(56) References Cited

U.S. PATENT DOCUMENTS

2022/0026130 A1* 1/2022 Schyver .................. F25D 25/00
2022/0346370 A1* 11/2022 Kwarcinski ............ B65D 85/54

OTHER PUBLICATIONS

R. P. H. Meier et al., Intra-Abdominal Cooling System Limits Ischemia-Reperfusion Injury During Robot-Assisted Renal Transplantation, pp. 1-23, Oct. 27, 2020.

Longchamp Alban et al., Impact of an intra-abdominal cooling device during open kidney transplantation in pigs. Swiss Medical Weekly. 2019;149:w20143. pp. 1-6.

* cited by examiner

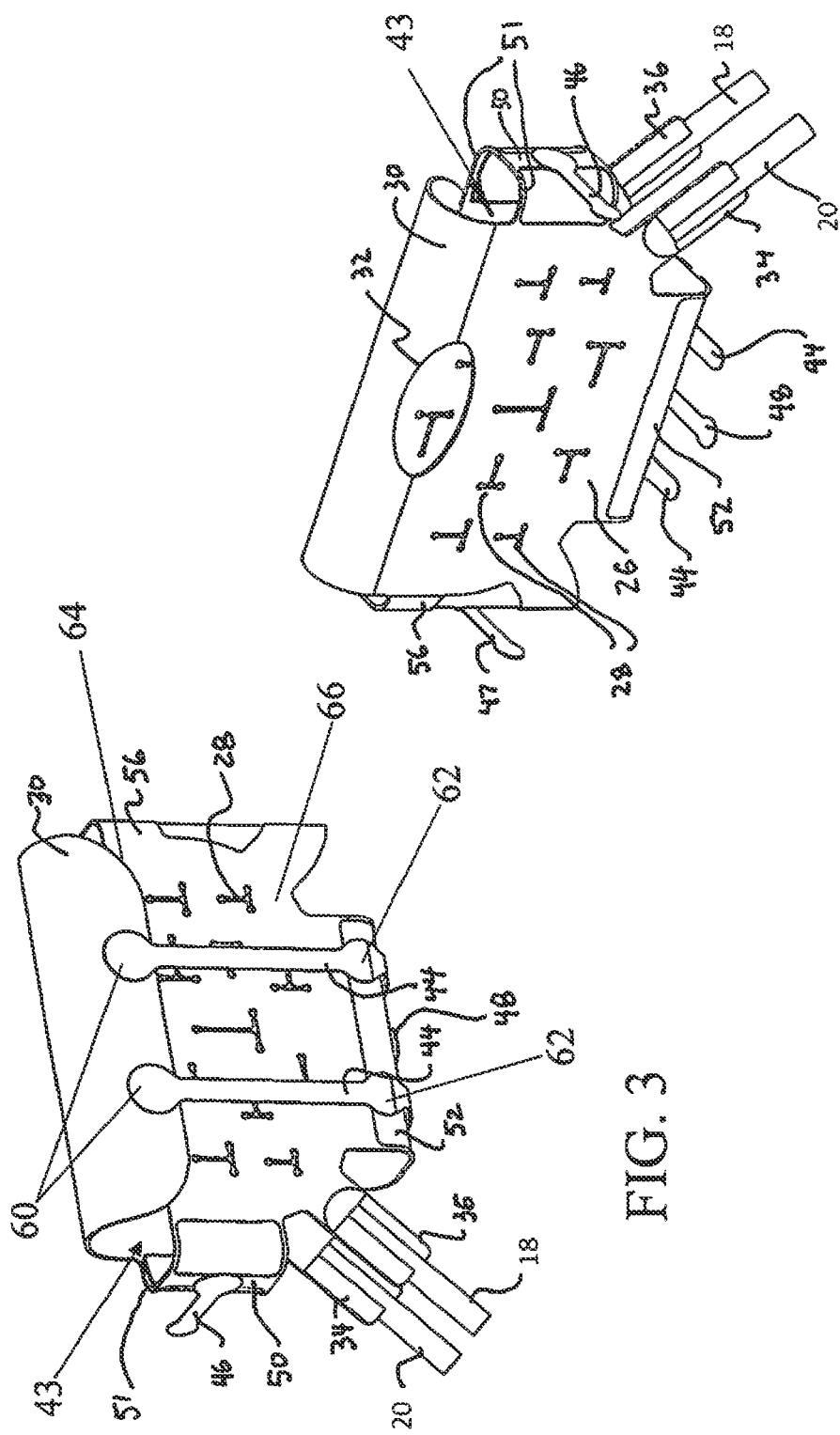

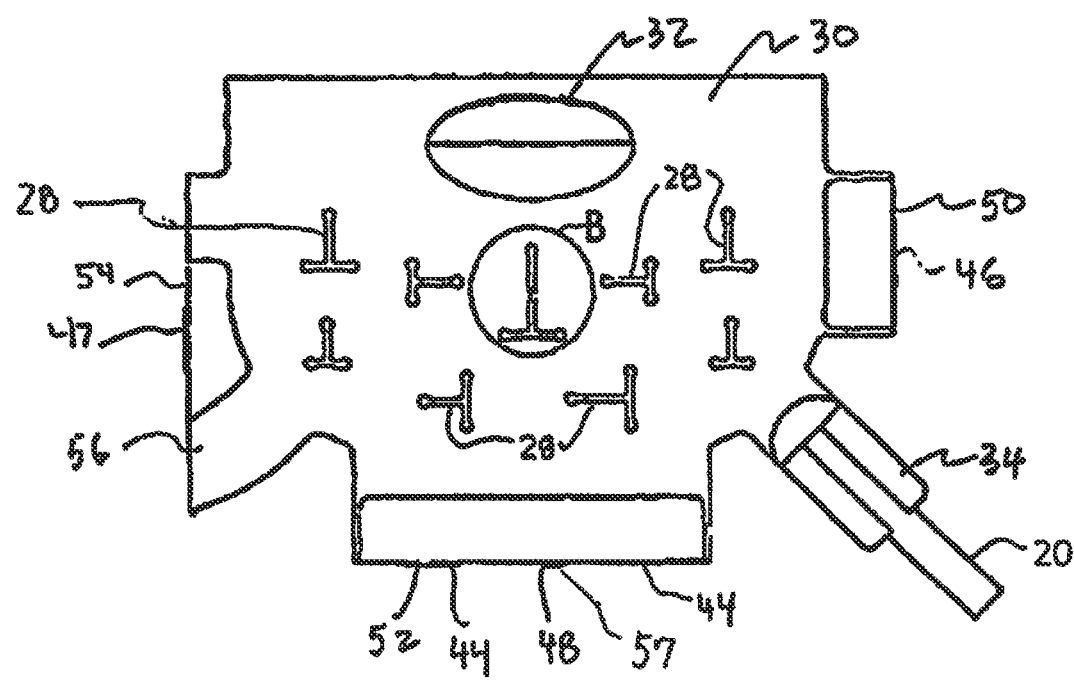
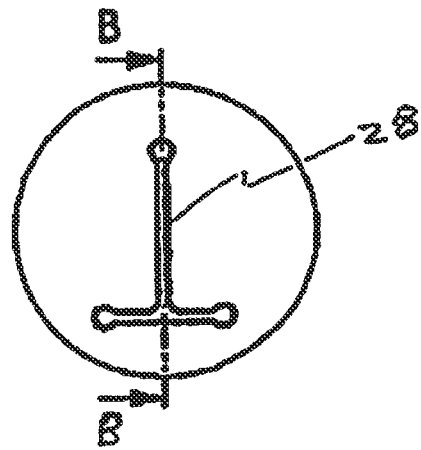
FIG. 8

KIDNEY COOLING SYSTEM

CROSS-REFERENCE TO RELATED APPLICATION

This application claims the benefit of U.S. Application Ser. No. 63/146,656, filed Feb. 7, 2021, which is hereby incorporated herein with reference to its entirety.

FIELD

The present technology is generally related to device, systems, and methods thereof for cooling a donor organ to be transplanted during a surgical procedure.

BACKGROUND

Kidney transplantation is the preferred treatment for patients with end-stage chronic kidney disease. Open approach is the most popular method, but minimally invasive surgery becomes more popular, especially due to development of robotic devices. Minimally invasive procedures are a good alternative which reduces the morbidity associated with the open surgical approach. Shorter recovery time and the lower complication rate are basic advantages of minimally invasive surgery. Robotic approach facilitates precise vascular anastomosis and ureteral reimplantation.

A kidney taken from a donor for transplantation must be kept at a low temperature to assure graft survival. It is easy to maintain low temperature during kidney transportation to the clinic where transplantation will take place, as the organ can be transported in an icebox. However, a primary issue that arises is how to keep low graft temperature during surgery as the graft is surrounded by the recipient patient's organs with temperatures around 38° C.

Ice slush is commonly used to maintain low graft temperature—kidney is wrapped with multiple layers of gauze with ice slush between the layers. A disadvantage of this technique is that as the ice melts, the temperature of the graft rises. It is difficult to change gauze wrap during surgery and the only other way of extending the graft's hypothermia time is to add ice slush directly to the abdominal cavity. However, ice slush may lead to development of local systemic hypothermia affecting bowel function—in particular, ileus may develop complications. According to existing methods and systems, the graft temperature should be kept below 20° C. before restoring blood flow.

SUMMARY OF THE INVENTION

The present kidney cooling system aims to improve the conditions of organ hypothermia during the transplant surgery. Protection of the tissue against damage caused by ischemia depends on the appropriate cooling of the organ during the time from collection from the donor to the donation to the patient. A novel cooling system has been designed to maintain an even temperature distribution of the organ during surgery process. The cooling system includes of a heat exchanger, a reservoir with a cooling liquid (which is provided by hospitals in daily uses), cooling pads (cooling jacket) and closed-circuit tubing connecting all elements of cooling system with the pump. The coolant circulates in a closed system. The shape of the cooling jacket may be designed to similar shape of the anatomical kidney.

The entire volume of the transplant is covered by the cooling jacket. Due to the anatomical diversity, cooling jackets embodying the invention are configured in various sizes. The sizes of the cooling jackets can differ in width, length and oval cutouts for blood vessels and ureter.

From the foregoing compendium, it will be appreciated that an aspect of the present invention is to provide an improved cooling device of the general character described which is not subject to the aforementioned disadvantages discussed in the background of the invention.

A consideration of the present invention is to provide a medical device for thermally treating a donor organ to be transplanted within a patient. The medical device comprises a jacket that includes a first section and a second section adjacent to the first section. The first and second sections are folded about a hinge to form a pocket sized to receive the donor organ. The first and second sections are secured together by a plurality of conjoined weld bar sets. A sling depends from the second section and has a strap. The strap includes a first end portion coupled to the sling, and an opposite second end portion affixed to one set of the plurality of conjoined weld bar sets.

In another aspect of the present invention, the sling is configured to fold over the pocket when the opposite second end portion of the strap is coupled to the one set of the plurality of conjoined weld bar sets.

In another aspect of the present invention, the jacket further includes a plurality of biocompatible layers joined together by a plurality of electrostatic welds arranged about the first and second sections.

In another aspect of the present invention, the plurality of biocompatible layers defines a series of channels within the jacket, the series of channels define a fluid flow pathway around each electrostatic weld.

In another aspect of the present invention, each of the plurality of electrostatic welds is substantially "T" shaped and the plurality of electrostatic welds is arranged about an entirety of the jacket.

In another aspect of the present invention, the plurality of weld bar sets includes a first weld bar set and a second weld bar set spaced apart from the first weld bar set.

In another aspect of the present invention, the first weld bar set lies in a first plane and the second weld bar set lies in a second plane orthogonal to the first plane.

In another aspect of the present invention, the jacket further includes a plurality of positioning tabs. At least one positioning tab of the plurality of positioning tabs is coupled to each weld bar set of the plurality of weld bar sets.

In another aspect of the present invention, the sling and the second section define an aperture therebetween sized and shaped to allow for the protrusion of at least one artery, vein, and ureter associated with the donor organ.

In another aspect of the present invention, the first and second sections are joined by a web defining an opening. The jacket further includes a weld bar extending through the opening and coupled to the web.

In another aspect of the present invention, the weld bar is coplanar with the hinge.

Another consideration of the present invention is to provide a plurality of biocompatible layers joined together by a plurality of electrostatic welds. The plurality of biocompatible layers form a series of channels therebetween. The series of channels define a fluid flow pathway around each electrostatic weld.

In another aspect of the present invention, each electrostatic weld is substantially "T" shaped and arranged symmetrically about the jacket.

In another aspect of the present invention, the jacket further includes a first section having an inflow tube and a second section having an outflow tube. The inflow and outflow tubes are in fluid communication with the series of channels for the circulation of fluid along the fluid flow pathway.

In another aspect of the present invention, the first section and second sections are adjacent to each other and are folded about a hinge to form a pocket sized to receive a donor organ. The first and second sections are secured together by a plurality of conjoined weld bar sets.

In another aspect of the present invention, a sling depends from the second section and has a strap. The strap has a first end portion coupled to the sling and an opposite second end portion affixed to one set of the plurality of conjoined weld bar sets.

In another aspect of the present invention, the plurality of weld bar sets includes a first weld bar set and a second weld bar set spaced apart from the first weld bar set. The first weld bar set lies in a first plane and the second weld bar set lies in a second plane different than the first plane.

In another aspect of the present invention, the sling and the second section define an aperture therebetween sized and shaped to allow for the protrusion of at least one artery, vein, and ureter associated with the donor organ.

Yet another consideration of the present invention is to provide a method of thermally treating a donor organ to be transplanted within a patient. The method comprises: providing a donor organ and a jacket. The jacket includes a plurality of biocompatible layers joined together by a plurality of electrostatic welds. The jacket defines a pocket sized and shaped to receive the donor organ, and an aperture sized and shaped to allow for the protrusion of at least one artery, vein, and ureter associated with the donor organ. The method further comprises positioning the donor organ within the pocket and closing the jacket, positioning the closed jacket within a target transplantation site, and circulating coolant within the jacket along a fluid flow pathway defined by a series of channels and the plurality of electrostatic welds to cool the donor organ to a temperature below 20° C.

In another aspect of the present invention, the jacket further includes a first section and a second section adjacent to the first section. The first and second sections are folded about a hinge to form the pocket. The first and second sections are secured together by a plurality of conjoined weld bar sets. A sling depends from the second section and has a strap. The strap includes a first end portion coupled to the sling and an opposite second end portion affixed to one set of the plurality of conjoined weld bar sets.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3 comprises a right isometric view of the cooling jacket in accordance with the principles of the present invention;

FIG. 4 comprises a left isometric view of the cooling jacket in accordance with the principles of the present invention;

FIG. 8 is a rear elevational view of the cooling jacket;

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein.

Applicant(s) do not intend for any term in the specification or claims to be ascribed an uncommon or special meaning unless explicitly set forth as such. Further, the present invention encompasses present and future known equivalents to the known components referred to herein by way of illustration.

Figure 1:
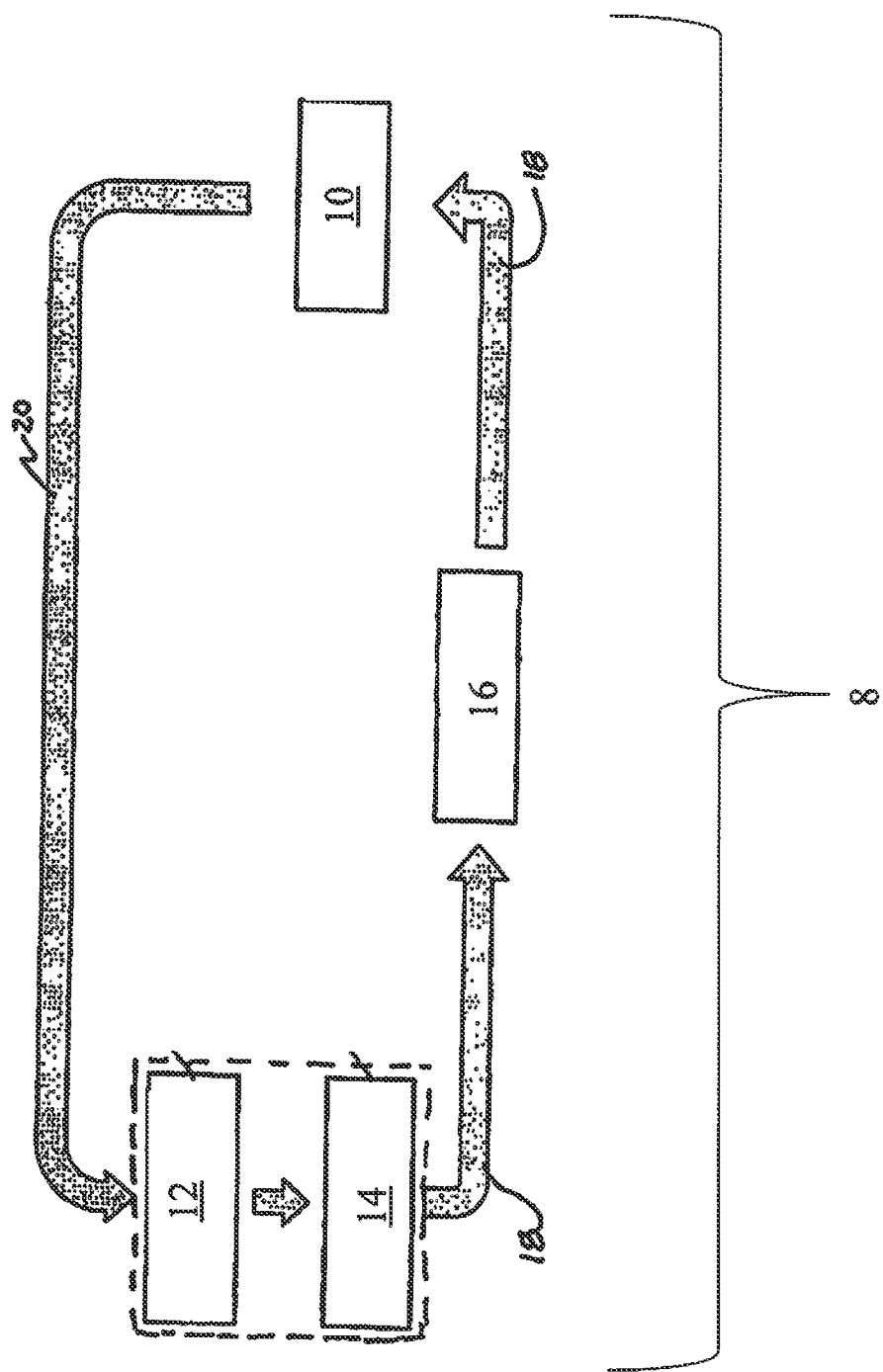
FIG. 1 shows an overall schematic diagram of a kidney cooling system in accordance with the principles of the present invention.

Referring now to the drawing figures where like elements have like reference numerals, FIG. 1 illustrates a medical system for improving the conditions of organ hypothermia during a transplant surgery and designated generally as "8". The medical system 8 may include a jacket 10 configured to thermally treat an organ prior to or during a surgical transplant procedure. In some example embodiments, the jacket 10 may be a cooling jacket configured to cool a donor organ to a predetermined or desired temperature to prevent or delay organ revascularization and assure donor organ survival by extracting heat from the donor organ. The entire volume of the operating area may be covered by the jacket 10. Due to the anatomical diversity, jackets 10 embodying the present invention may be configured in various sizes. The sizes of the jackets can differ in width, length, and may include various cutouts or openings for blood vessels and ureter. The thickness of the jacket 10 has been designed to properly adhere to the organ and ensure heat transfer by conduction. In some embodiments, the donor organ is a kidney.

In some embodiments, the system 8 further includes a supply of cooling liquid (i.e., coolant) stored within a fluid supply bottle or reservoir 12. In various embodiments, the reservoir 12 may comprise a coiled portion of the tubing encased within a heat exchanger 14 within a closed-loop system. The fluid supply reservoir 12 may be configured to retain coolant that is used to thermally treat the donor organ. As a non-limiting example, the heat exchanger 14 may be a cooling sleeve. In some embodiments, the coolant and/or the fluid supply reservoir 12 may be stored in a conventional freezer at 4° C. before use. The heat exchanger 14 may be a cooling sleeve that fits standard-sized bottles up to two liters in capacity. Prior to use, the cooling sleeve may be placed into a conventional freezer at −20° C. for at least twelve hours. Once the cooling sleeve has been cooled for the appropriate time, it may be wrapped around or otherwise affixed to the reservoir 12 and tightened. The cooling sleeve and reservoir 12 may then be cooled at approximately 4° C. until the time of a surgical procedure.

It should be understood that the jacket 10 is capable of working with various heat exchangers not described herein. The use of a cooling sleeve for the fluid supply reservoir is by way of example only and illustrative of only one of many ways to effect heat exchange. The fluid supply reservoir 12 with coolant can be placed in a bottle cooler sleeve or in a heat insulating container filled with ice slush. Alternatively, the reservoir 12 can be directly immersed in an ice container and then placed in a heat insulating container or wrapped in a bottle cooler sleeve and then placed in a heat insulating container. Heat exchange can also be affected by a heat exchanger formed of panels or tubular coils immersed in a container of ice slush with the sterile coolant flowing directly through the soils or between the panels. In some embodiments, heat exchanger systems such as mini-chillers or Peltier thermoelectric modules may also be employed.

As shown in FIGS. 1-4, the jacket 10 includes an inflow tube 18 and an outflow tube 20, which allows the jacket 10 to be in fluid communication with the fluid supply reservoir 12 and heat exchanger 14. The inflow tube 18 may extend from the heat exchanger 14 through a fluid flow pump 16 (shown in FIG. 1) and to the jacket 10. As a non-limiting example, the fluid flow pump 16 may be a peristaltic pump configured to initiate the delivery of coolant to the jacket 10. Once coolant is circulated throughout the jacket 10, it may be recycled for continued use within the system 8 via the outflow tube 20. Thus, the jacket 10 is in fluid communication with the fluid supply reservoir 12 via the outflow tube 20. In some embodiments, the fluid flow pump 16 may initiate the delivery of coolant to the jacket 10 at a flow rate of 120 milliliters per minute (ml/min). However, it is to be understood that this flow rate is only one example and the fluid flow rate is variable as a function of the composition of the coolant itself, the coolant temperature at the jacket input, the mass of the transplant, and the heat transfer coefficient.

Although not described in detail herein, it should be understood that the tubing (i.e., the inflow and outflow tubes 18, 20) can be adapted to fit into the jacket 10 via conventional medical tubing connectors such as, for example, connectors 34 and 36 (shown in FIGS. 3 and 4). According to some embodiments, the connectors 34 and 36 may be tubes permanently welded and integrated with inflow and outflow tubes 18, 20, and thus are not exchangeable. In various other embodiments (not shown), exchangeable connectors (other than connectors 34 and 36) can be fixed within the inflow tube 18 and outflow tube 20. Further, it is to be understood that the flexible tubing of inflow tube 18 and outflow tube 20 can be quickly replaced and adapted to fit the fluid flow pump 16 through the use of a conventional clamp (not shown) of the fluid flow pump 16. The clamp has a lever that is used to move the clamp up and down in order to position the tubing 18, 20 into the pump 16. In some embodiments, any conventional tubing connectors or clamp may be employed in conjunction with the present invention.

The jacket 10 may be made of multi-layered biocompatible material. The biocompatible material may be fabricated of any suitable medical grade thermoplastic, such as, for example, polyurethane, polyethylene, polypropylene, polyamide, polyvinyl chloride, acrylonitrile butadiene styrene, and the like. Throughout at least a portion of the jacket 10, adjacent layers may together define a channel or series of channels sized and configured to receive coolant that is delivered to the jacket 10.

The cooling process of the jacket 10 takes place through the channels (discussed in more detail below). Optimal cooling is assured by the series of channels formed between the layers of biocompatible material. A suitable temperature distribution associated with the laminar flow is provided by a series of baffle welds which separate the layers of the jacket 10 to provide a plurality of flow paths for the free flow of coolant throughout the jacket 10 and eliminate "dead" areas of the flow. When the coolant fills the channels, the walls of the jacket 10 expand and cause the first layer 24 of the jacket 10 to come into contact with, and adhere to, the donor organ. In other words, when the jacket 10 is closed, the first layer 24 of the jacket 10 adheres to the donor organ for cooling.

The flow of coolant between various sections (described in more detail below) of the jacket 10 and the fluid supply reservoir 12 is controlled by the fluid flow pump 16, which may be an electric system or alternative positive flow mechanism. The heat exchanger 14 may be adapted to various types of coolant containers, reservoirs, or other storage mechanisms.

Figure 2:
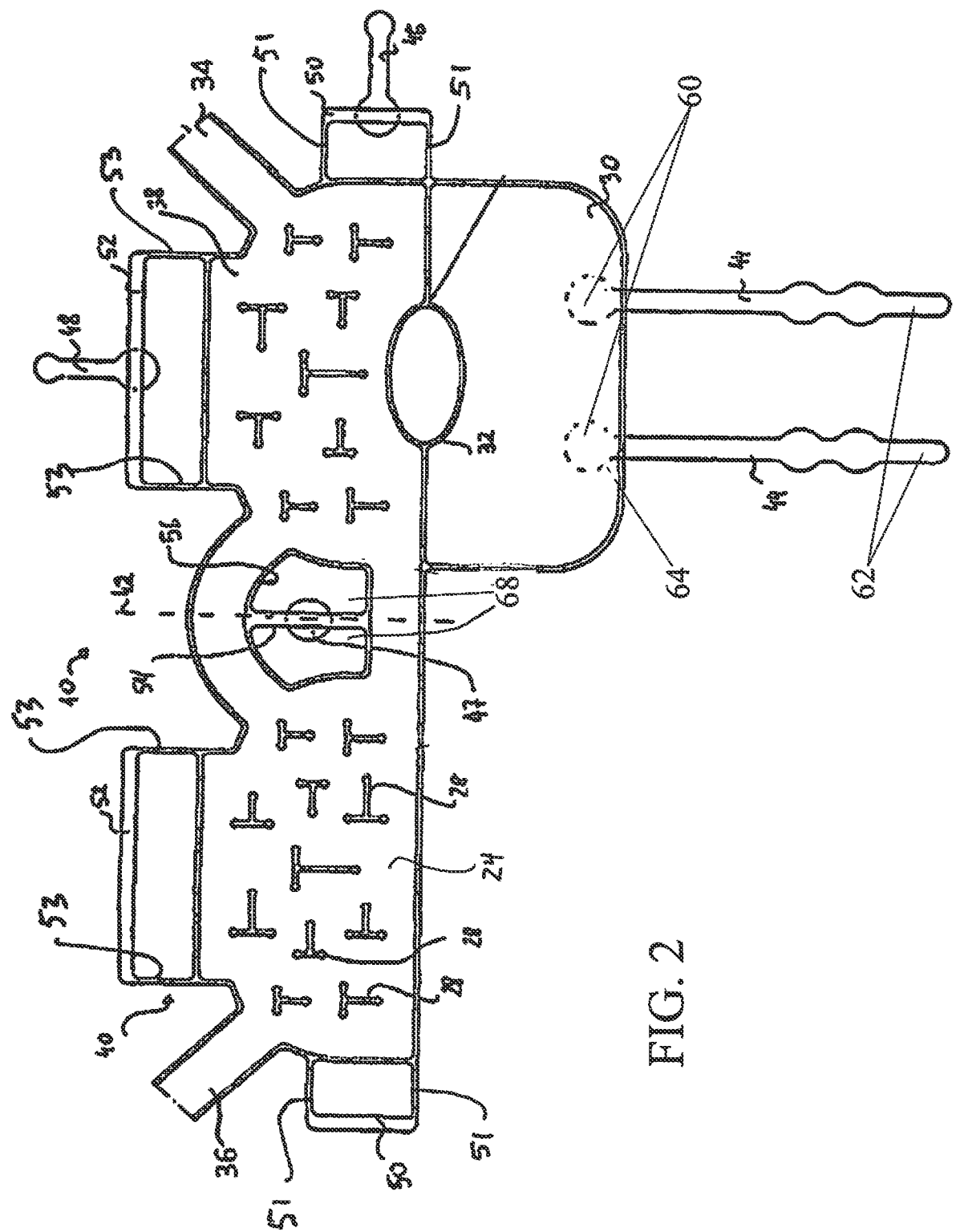
FIG. 2 shows a plan view of a cooling jacket in accordance with the principles of present invention in an open butterfly configuration prior to forming a pocket for receiving an implant;.
Figure 5:
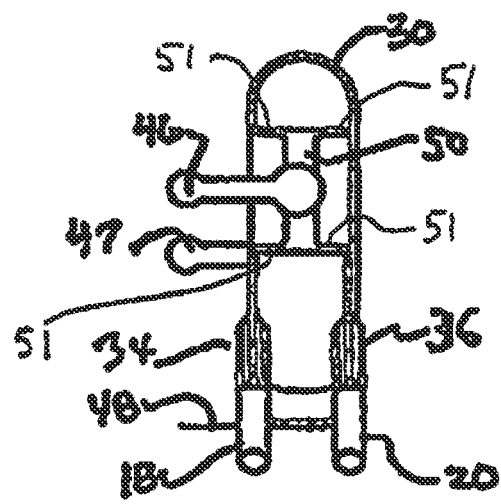
FIG. 5 comprises a side view of the cooling jacket in accordance with the principles of the present invention.
Figure 6:
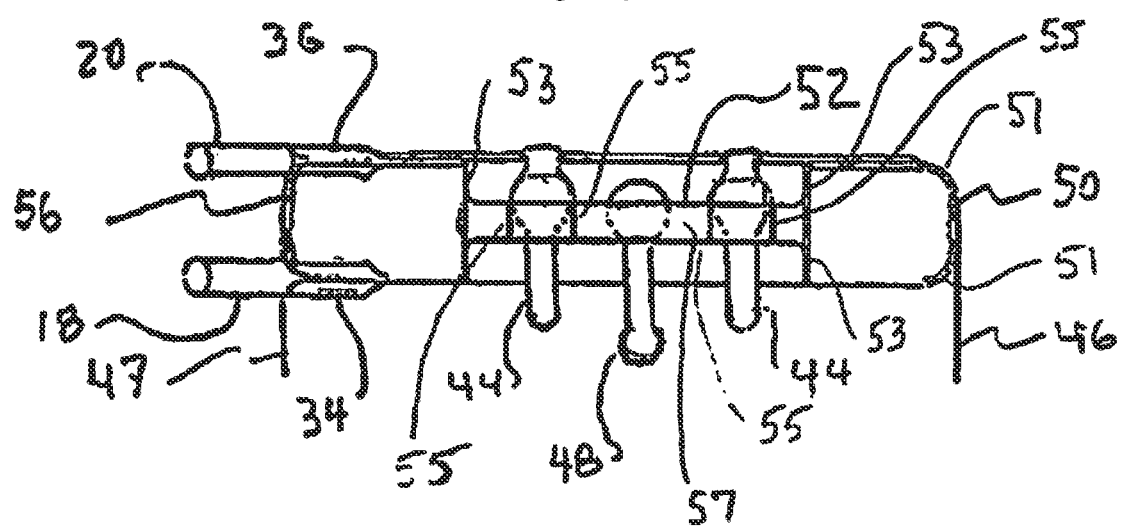
FIG. 6 shows a bottom view of the cooling jacket in accordance with the principles of the present invention.

Now referring to FIGS. 2-6, the jacket 10 is shown in an "open" butterfly configuration prior to receiving a donor organ in FIG. 2, and a "closed" configuration once the donor organ has been received in FIGS. 3-4. The jacket 10 includes a first section 40 and a second section 38 which are folded about a fold line or hinge 42 to form a pocket 43 (shown in FIGS. 3-4) for receiving the donor organ. A weld bar 50 may be connected to each lateral end of the first and second sections 40, 38, by a pair of flexible legs 51 (for example, as shown in FIGS. 2 and 5-6). When the first and second sections 40, 38, are folded over the hinge 42, the two weld bars 50 are overlapped, registered with one another and secured together by a continuous weld. A positioning tab 46 is spot welded to the conjoined weld bars 50. A web 56 wraps about the opposite lateral end of the folded sections 40, 38. As shown in FIGS. 2, a further weld bar 52 is connected to the first and second sections 40, 38, by a pair of flexible legs 53. After the sections 40, 38, are folded, the two weld bars 52 are overlapped, registered with one another and are secured together by a continuous weld. A further positioning tab 48 is spot welded to the conjoined weld bars 52. In some embodiments, when the jacket 10 is in the open configuration, the weld bars 52 may each lie in a plane substantially orthogonal to each weld bar 50.

Figure 7:
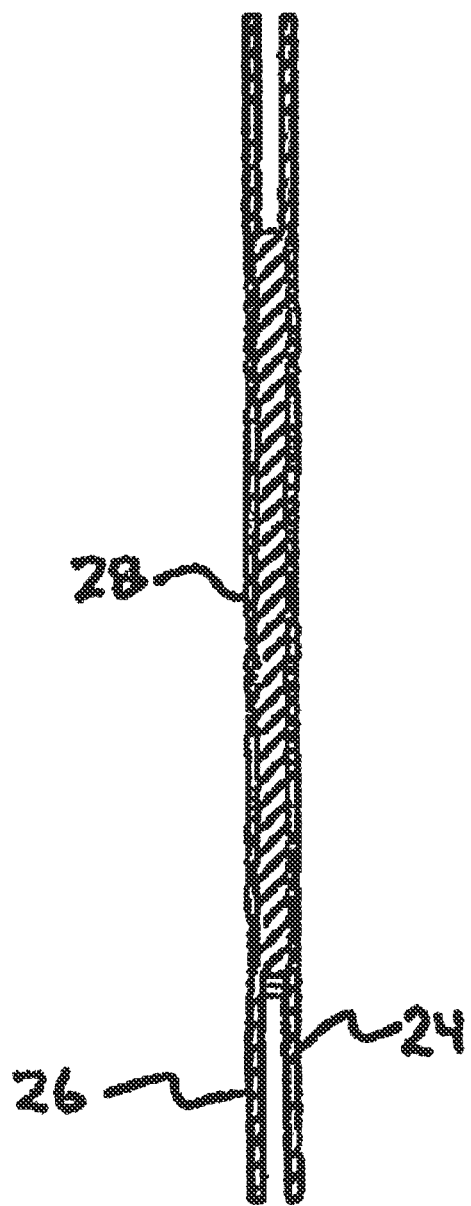
FIG. 7 is a greatly enlarged scale sectional view taken through plane B-B of the circled portion "B" of FIG. 8 and through two layers of the cooling jacket and illustrating a "T" shaped weld which spaces the layers and provides a flow path for cooling liquid.

As shown in FIGS. 7-8, the jacket 10 may include a unitary double panel with a first layer and second layer 24, 26 joined by "T" shaped baffle welds 28 of varying sizes and orientations. The baffle welds are arranged in a pattern to provide a laminar circulation flow path between layers 24, 26 for the circulation of coolant. The channels formed between layers of the jacket 10 define a continuous fluid flow path around each "T" shaped baffle weld 28.

As best illustrated in FIG. 6, a third layer or stringer 57 is registered with and positioned over the conjoined weld bars 52. Also, a portion of the positioning tab 48 is spot welded to the conjoined weld bars 52. The stringer 57 is secured over the conjoined weld bars 52 and the tab 48 by a series of discrete transverse weld lines 55 (shown in FIG. 6), whereby open slots are formed between adjacent weld lines 55. With the weld bars 50, 52 secured by their respective continuous welds, the pocket 43 for receiving the donor organ has been formed.

When in the open configuration (shown in FIG. 2), the first and second sections 40, 38, may be substantially symmetrical and include the same or differing number of "T" shaped welds 28. Additionally, the first section 40 may include the inflow tube 18 and the second section 38 may include the outflow tube 20 diametrically opposed to the inflow tube 18. When the jacket 10 is transitioned to the closed configuration, the inflow and outflow tubes 18, 20 may be positioned such that the tubes 18, 20, are adjacent or proximate to each other (as shown in FIGS. 3-4).

As shown in FIGS. 2-4, the jacket 10 may include a third section such as a flap or sling 30 which may depend from the second section 38 for insertion of the donor organ into the pocket 43. Together, the second section 38 and sling 30 define an appropriately sized aperture 32. In embodiments where the donor organ is a kidney, the aperture 32 allows for the protrusion of a renal artery, renal vein, and/or the ureter of the patient receiving the donor organ. The renal artery carries oxygenated blood from the heart to the kidney and will be surgically attached to the iliac artery of the patient. The renal vein, which returns the blood form the kidney, is attached to the iliac vein while the ureter, when attached to the bladder, serves as the conduit of the urine formed by filtration of blood by the kidney.

Figure 9:
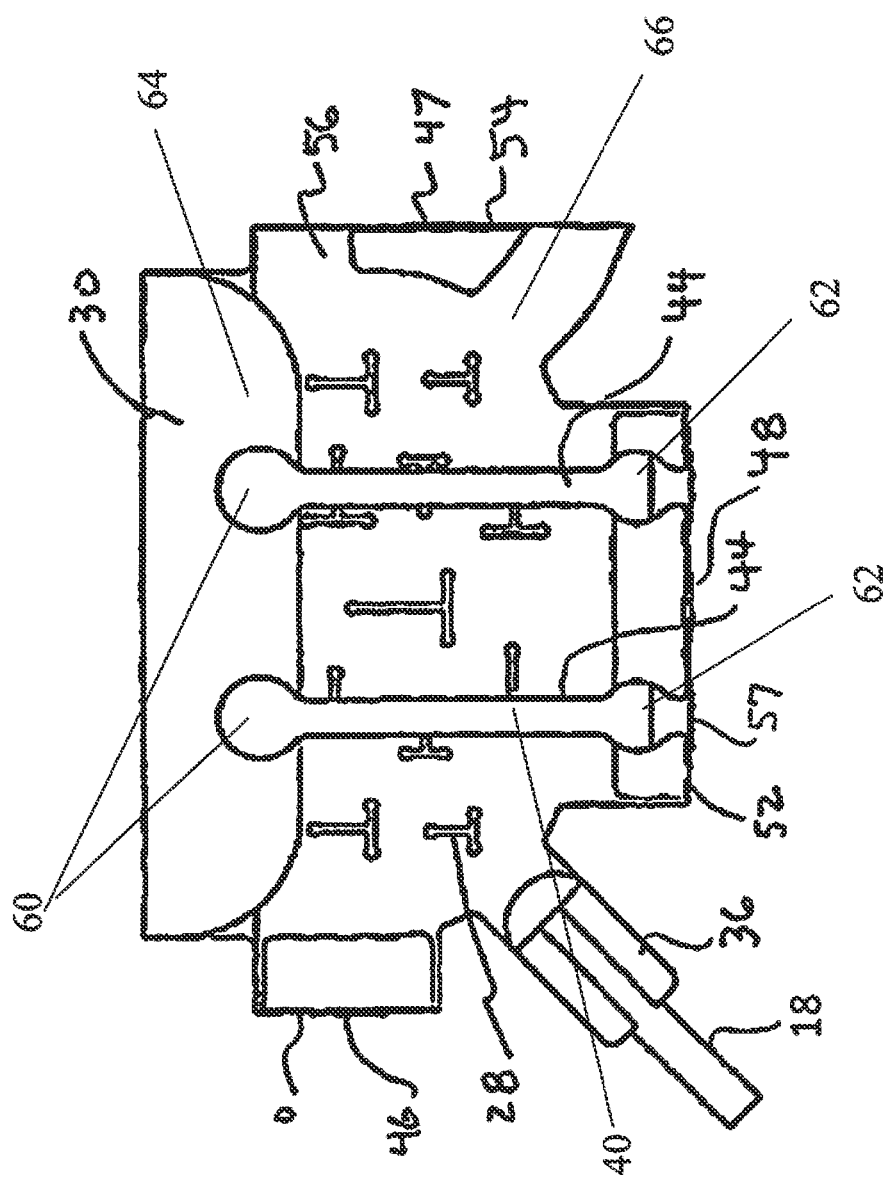
FIG. 9 is a front elevational view of the cooling jacket.

As shown in FIG. 9, a pair of straps 44 are provided for securing the jacket 10 at least partially around or about the donor organ. Each strap 44 may have a proximate end portion 60 and a distal end portion 62 opposite the proximate end portion 60. The proximate end portion 60 of each strap 44 may be spot welded to the sling 30 at or proximate to a lip portion 64 of the sling 30. The distal end portion 62 of each strap 44 may be secured to the conjoined weld bars 52. Adjacent the other end of each strap 44, the straps 44 are threaded through the slots formed between the adjacent weld lines 55 (shown in FIG. 6). The straps 44 allow for closing of jacket 10 and the ability for clinicians to move the jacket 10 in the operating area during surgery. It should be understood that in various embodiments, the jacket 10 may also include only a single strap 44 or more than two straps 44. The straps 44 may be arranged in a symmetrical pattern to evenly secure the jacket 10 and may also be formed of a biocompatible material. As shown in FIG. 9, when the jacket 10 is in the closed configuration, the lip portion 64 of the sling 30 and the straps 44 may extend partially over the second layer 26 of the first section 40 when the first section 40 is folded over the hinge 42 and secured to the second section 38. The distal end portion 62 of each strap 44 may be releasably coupled or permanently affixed to the conjoined weld bars 52.

The positioning tab 46, at least partially affixed to the conjoined weld bars 50, a further positioning tab 47 at least partially affixed to a weld bar 54 of the web 56, and the tab 48 are employed to position the implant and the jacket 10 within the patient's body cavity. The continuous welds 28, as well as the weld lines 55, may comprise electrostatic welds and the straps 44 as well as the tabs 46, 47, and 48 may be adhered by electrostatic welds. As shown in FIGS. 3-4 and 9, in some embodiments, the positioning tabs 46 and 47 may each extend outwardly in the same direction and away from the straps 44. The positioning tab 46 may also be diametrically opposed to the positioning tab 47 when the jacket 10 is in the closed configuration. As shown in FIG. 2, the weld bar 54 may extend through the web 56 and divide the web 56 into symmetrically shaped openings 68. The weld bar 54 may also be coplanar with the hinge 42.

Figure 10:
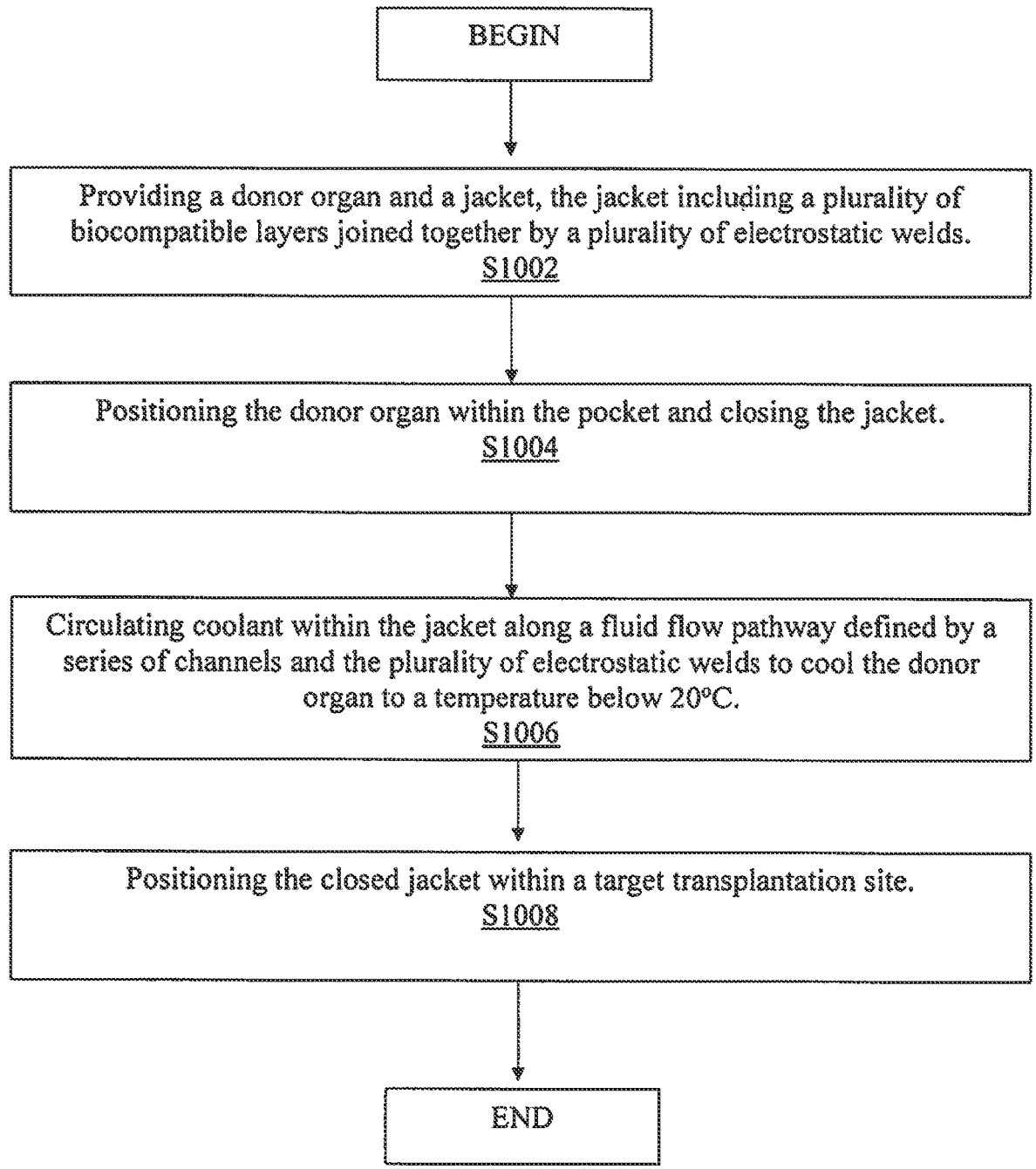
FIG. 10 comprises a flowchart of an exemplary method in accordance with the principles of the present invention.

Now referring to FIG. 10, a flowchart constructed in accordance with the principles of the present invention is shown. The method includes storing a fluid supply reservoir 12 having coolant at approximately 4° C. within a conventional freezer for a sufficient time, e.g., twelve hours, prior to use during a surgical procedure. The fluid supply reservoir 12 may be a pre-cooled container, bottle, or a soft bag with sterile coolant. The heat exchanger 14 may then be stored within a conventional freezer at −20° C. for at least twelve hours and wrapped around the fluid supply reservoir 12. Once the heat exchanger 14 is wrapped around the reservoir 12, the reservoir 12 and heat exchanger 14 are cooled at 4° C. for ready use. Once, the cold storage and standard preparation techniques have been completed, a donor organ and jacket 10 are provided (Block S1002). The donor organ is positioned within a pocket 43 of the jacket 10 (Block (S1004). The blood vessels of the donor organ and ureter are passed through the aperture 32 defined by the second section 38 and sling 30, and then the sling 30 is secured to the first and/or second sections 40, 38, to close the jacket 10. Inflow and outflow tubes 18, 20 may then be coupled to the jacket 10 via conventional tubing connectors 34 and 36 to form a closed-loop system. Once the inflow tube 18 and outflow tube 20 have been coupled to the jacket 10, the fluid flow pump 16 may be automatically or manually turned on and the flow rate set to 120 ml/min so that coolant may be delivered to the jacket 10 and circulated along the flow path defined by the channels around each baffle weld 28 (Block S1006). As coolant is circulated within the jacket 10, the jacket 10 expands and adheres to the surface of the donor organ to ensure thermal energy transfer and the cooling of the organ to a temperature below 20° C. The donor organ encapsulated in the jacket 10 may then be introduced into and positioned within the abdominal cavity or other target transplantation site of the receiving patient (Block S1008).

In robotic surgery, the donor organ may be introduced through an incision where a gel point (not shown) is placed in advance. An additional advantage in robotic surgery is that unlike with gauze/ice slush techniques, donor organ or graft dimensions are not much increased by the cooling jacket 10 as perfusion with coolant starts after the donor organ has been introduced into the abdominal cavity. It is important as the gel point has limited diameter for insertion of the donor organ. Additionally, and/or alternatively, in open surgery, the inflow and outflow tubes 18, 20 of the jacket 10 may then be passed through the gel point. Both in minimally invasive and open procedures, use of a cooling jacket does not need to change surgical techniques so the learning curve is fast as it needs proper installation of the cooling jacket only.

In yet another example method in accordance with the principles of the present invention, after the aforementioned cold storage and standard preparation techniques, the following procedural steps may be performed:

(1) The donor organ is placed inside the cooling jacket 10. (2) kidney vessels and ureter are passed through the aperture 32 of the sling 30. (3) The jacket 10 is closed. (4) In robotic surgery, graft encapsulated in the jacket is introduced into the abdominal cavity through an incision where the gel point is placed in advance. Inflow and outflow tubes 18, 20, of the cooling jacket 10 are passed through the gel point. (5) In open surgery, the donor organ encapsulated in the jacket 10 is introduced into the abdominal cavity through a standard incision. Inflow and outflow tubes 18, 20, of the cooling jacket 10 are passed through the same standard incision. (6) Pre-cooled fluid supply reservoir 12 with sterile coolant is encased in a suitable heat exchanger 14. (7) Suitable tubing connectors 34, 36 connect the inflow and outflow tubes 18, 20 to the associated ports of the jacket 10. Coolant is then forced through the inflow tube 18 by the pump 16. (8) Outflow tube 20 connects the outlet port of the cooling jacket 10 with an inlet port of the fluid supply reservoir 12 or directly to the heat exchanger 14. (9) The peristaltic pump 16 is then activated and coolant fills jacket 10. Soft walls of the jacket 10 expand and adhere to the donor organ surface to ensure optimal thermal energy transfer. Of note, heat exchanger 14 and/or the fluid supply reservoir 12 can be replaced during procedure, if necessary. (10) In procedures where the donor organ is a kidney, aperture 32 allows convenient access to the renal hilum for performance of vascular anastomosis. (11) Vascular anastomosis (artery and vein) and ureter reimplantation may then be performed according to standard transplantation procedure. (12) After conclusion of vascular anastomosis and reperfusion of the donor organ, the sling 30 of the cooling jacket 10 is cut, and the jacket 10 is removed from the donor organ.

It should be understood that the system of the present invention can be readily adapted for use with any available cooling liquid and the jacket may be configured for transplantation of other organs. Additionally, the system 10 described herein may also be adapted to open and robotic surgery.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A medical device for thermally treating a donor organ to be transplanted within a patient, the medical device comprising:
a jacket comprising:
a first section and a second section adjacent to the first section, the first and second sections being folded about a hinge to form a pocket sized to receive the donor organ;
the first and second sections being secured together by a plurality of conjoined weld bar sets, wherein each of the conjoined weld bar sets comprises a first weld bar connected to the first section by a first pair of flexible legs, and a second weld bar connected to the second section by a second pair of flexible legs, the first and second weld bars configured to overlap when the first and second sections are folded over the hinge; and
a sling depending from the second section and having a strap, the strap comprising:
a first end portion coupled to the sling; and
an opposite second end portion affixed to one set of the plurality of conjoined weld bar sets.

2. The medical device of claim 1, wherein the sling is configured to fold over the pocket when the opposite second end portion of the strap is coupled to the one set of the plurality of conjoined weld bar sets.

3. The medical device of claim 1, wherein the jacket further comprises a plurality of biocompatible layers joined together by a plurality of electrostatic welds arranged about the first and second sections.

4. The medical device of claim 3, wherein the plurality of biocompatible layers defines a series of channels within the jacket, the series of channels defining a fluid flow pathway around each electrostatic weld.

5. The medical device of claim 4, wherein each of the plurality of electrostatic welds is substantially "T" shaped and the plurality of electrostatic welds is arranged about an entirety of the jacket.

6. The medical device of claim 1, wherein the plurality of conjoined weld bar sets comprises a first weld bar set and a second weld bar set spaced apart from the first weld bar set.

7. The medical device of claim 6, wherein the first weld bar set lies in a first plane and the second weld bar set lies in a second plane orthogonal to the first plane.

8. The medical device of claim 1, wherein:
the jacket further comprises a plurality of positioning tabs; and
at least one positioning tab of the plurality of positioning tabs is coupled to each weld bar set of the plurality of conjoined weld bar sets.

9. The medical device of claim 1, wherein the sling and the second section define an aperture therebetween sized and shaped to allow for a protrusion of at least an artery and a vein associated with the donor organ.

10. The medical device of claim 9, wherein the organ is a kidney and the aperture is sized and shaped to allow for protrusion of an artery, a vein, and a ureter associated with the kidney.

11. The medical device of claim 1, wherein:
the first and second sections are joined by a web defining an opening; and
the jacket further comprises a third weld bar extending through the opening and coupled to the web.

12. The medical device of claim 11, wherein the third weld bar extending through the opening is coplanar with the hinge.

13. A jacket for thermally treating an organ, comprising:
a first section and a second section adjacent to the first section, the first and second sections folded about a hinge to form a pocket sized to receive the organ;

the first and second sections being secured together by a plurality of conjoined weld bar sets, wherein each of the conjoined weld bar sets comprises a first weld bar connected to the first section by a first pair of flexible legs, and a second weld bar connected to the second section by a second pair of flexible legs, the first and second weld bars configured to overlap when the first and second sections are folded over the hinge;

a plurality of biocompatible layers joined together by a plurality of electrostatic welds; and the plurality of biocompatible layers forming a series of channels therebetween, the series of channels defining a fluid flow pathway around each electrostatic weld.

14. The jacket of claim 13, wherein each electrostatic weld is substantially "T" shaped and arranged symmetrically about the jacket.

15. The jacket of claim 13, wherein the first section further comprises an inflow tube and the second section further comprises an outflow tube, the inflow and outflow tubes are in fluid communication with the series of channels for circulation of fluid along the fluid flow pathway.

16. The jacket of claim 13, further comprises:
a sling depending from the second section and having a strap, the strap having:
a first end portion coupled to the sling; and
an opposite second end portion affixed to one set of the plurality of conjoined weld bar sets.

17. The jacket of claim 16, wherein:
the first weld bar set is spaced apart from the second weld bar set; and
the first weld bar set lies in a first plane and the second weld bar set lies in a second plane different than the first plane.

18. The jacket of claim 16, wherein the sling and the second section define an aperture therebetween sized and shaped to allow for a protrusion of at least an artery and a vein associated with the organ.

19. The jacket of claim 18, wherein the organ is a kidney and the aperture is sized and shaped to allow for protrusion of an artery, a vein, and a ureter associated with the kidney.

20. The jacket of claim 13, wherein:
the jacket further comprises a plurality of positioning tabs; and
at least one positioning tab of the plurality of positioning tabs is coupled to each weld bar set of the plurality of conjoined weld bar sets.

21. The jacket of claim 13, wherein:
the first and second sections are joined by a web defining an opening; and
the jacket further comprises a third weld bar extending through the opening and coupled to the web.

22. The jacket of claim 13, wherein the third weld bar extending through the opening is coplanar with the hinge.

* * * * *